(12) United States Patent
Adams et al.

(10) Patent No.: US 7,025,674 B2
(45) Date of Patent: Apr. 11, 2006

(54) METHOD AND APPARATUS FOR AWARDING AND REDEEMING PROMOTIONAL POINTS AT AN ELECTRONIC GAME

(75) Inventors: William R. Adams, Las Vegas, NV (US); Thomas J. Matthews, Las Vegas, NV (US)

(73) Assignee: IGT, Reno, NV (US)

( * ) Notice: Subject to any disclaimer, the term of this patent is extended or adjusted under 35 U.S.C. 154(b) by 130 days.

(21) Appl. No.: 10/308,961

(22) Filed: Dec. 3, 2002

(65) Prior Publication Data

US 2003/0083943 A1    May 1, 2003

Related U.S. Application Data

(63) Continuation of application No. 09/489,249, filed on Jan. 21, 2000, now abandoned.

(51) Int. Cl.
*A63F 9/24* (2006.01)
*G06F 17/60* (2006.01)

(52) U.S. Cl. .................... 463/1; 463/25; 463/29; 463/42; 463/16; 705/10; 705/14; 705/26; 705/27

(58) Field of Classification Search ............... 705/14; 463/1, 25, 42, 16
See application file for complete search history.

(56) References Cited

U.S. PATENT DOCUMENTS

| | | | |
|---|---|---|---|
| 3,918,716 A | 11/1975 | Nonaka et al. |
| 4,518,098 A | 5/1985 | Fleischer |
| 4,582,324 A | 4/1986 | Koza et al. |
| 4,621,814 A | 11/1986 | Stepan et al. |
| 4,941,090 A | 7/1990 | McCarthy |
| 5,038,022 A | 8/1991 | Lucero |
| 5,105,184 A | 4/1992 | Pirani et al. |
| 5,179,517 A | 1/1993 | Sarbin et al. |
| 5,265,874 A | 11/1993 | Dickinson et al. |
| 5,276,312 A | 1/1994 | McCarthy |
| 5,287,269 A | 2/1994 | Dorrough et al. |
| 5,371,345 A | 12/1994 | LeStrange et al. |
| 5,397,125 A | 3/1995 | Adams |
| 5,398,932 A | 3/1995 | Eberhardt et al. |

(Continued)

FOREIGN PATENT DOCUMENTS

AU    64844/98    11/1998

(Continued)

OTHER PUBLICATIONS

Richard M. Bueschel, "Lemons, Cherries and Bell-Fruit-Gum" (Nov. 1995).

*Primary Examiner*—Jean D. Janvier
(74) *Attorney, Agent, or Firm*—Beyer Weaver & Thomas, LLP (57) ABSTRACT

An electronic game including at least one display exhibiting a plurality of windows or segments each displaying a different subject matter is disclosed. The different subject matter in each of the plurality of windows preferably includes a real time promotional points total, an awards display, a sponsor advertising material display, an Internet display and an electronic game. The electronic game, which may include a wagering game, may be played by tendering money or tendering promotional points instead of money. Promotional points may be awarded instead of a portion of a money award, or supplemental to it. Promotional points may be accumulated by players through both gaming and non-gaming activities, including activities not involving a commercial transaction. An electronic gaming apparatus is described which also serves as an Internet portal.

8 Claims, 7 Drawing Sheets

U.S. PATENT DOCUMENTS

| | | |
|---|---|---|
| 5,402,872 A | 4/1995 | Clurman |
| 5,429,361 A | 7/1995 | Raven et al. |
| 5,470,079 A | 11/1995 | LeStrange et al. |
| 5,537,314 A | 7/1996 | Kanter |
| 5,551,692 A | 9/1996 | Pettit et al. |
| 5,613,912 A | 3/1997 | Slater |
| 5,643,088 A | 7/1997 | Vaughn et al. |
| 5,655,961 A | 8/1997 | Acres et al. |
| 5,672,109 A | 9/1997 | Natanian |
| 5,697,611 A | 12/1997 | Kelly et al. |
| 5,725,428 A | 3/1998 | Achmuller |
| 5,761,647 A | 6/1998 | Boushy |
| 5,766,075 A | 6/1998 | Cook et al. |
| 5,769,716 A | 6/1998 | Saffari et al. |
| 5,774,870 A | 6/1998 | Storey |
| 5,806,045 A | 9/1998 | Biorge et al. |
| 5,809,482 A | 9/1998 | Strisower |
| 5,816,918 A | 10/1998 | Kelly et al. |
| 5,820,460 A | 10/1998 | Fulton |
| 5,833,536 A | 11/1998 | Davids et al. |
| 5,851,148 A | 12/1998 | Brune et al. |
| D404,436 S | 1/1999 | McGahn et al. |
| 5,876,284 A | 3/1999 | Acres et al. |
| 5,882,261 A | 3/1999 | Adams |
| 5,902,184 A | 5/1999 | Bennett |
| 5,902,983 A | 5/1999 | Crevelt et al. |
| 5,909,486 A | 6/1999 | Walker et al. |
| 5,911,418 A | 6/1999 | Adams |
| 5,923,016 A | 7/1999 | Fredregill et al. |
| 5,937,391 A | 8/1999 | Ikeda et al. |
| 5,941,772 A | 8/1999 | Paige |
| 5,946,664 A | 8/1999 | Ebisawa |
| 5,947,820 A | 9/1999 | Morro et al. |
| 5,951,397 A | 9/1999 | Dickinson |
| 5,974,135 A | 10/1999 | Breneman et al. |
| 5,983,196 A | 11/1999 | Wendkos |
| 5,991,736 A | 11/1999 | Ferguson et al. |
| 6,003,013 A | 12/1999 | Boushy et al. |
| 6,007,426 A | 12/1999 | Kelly et al. |
| 6,015,344 A | 1/2000 | Kelly et al. |
| 6,032,955 A | 3/2000 | Luciano et al. |
| 6,036,601 A | 3/2000 | Heckel |
| 6,068,553 A | 5/2000 | Parker |
| 6,110,041 A | 8/2000 | Walker et al. |
| 6,113,098 A | 9/2000 | Adams |
| 6,113,495 A | 9/2000 | Walker et al. |
| 6,139,431 A | 10/2000 | Walker et al. |
| 6,141,684 A | 10/2000 | McDonald et al. |
| 6,165,071 A | 12/2000 | Weiss |
| 6,183,362 B1 | 2/2001 | Boushy |
| 6,183,366 B1 | 2/2001 | Goldberg et al. |
| 6,186,893 B1 * | 2/2001 | Walker et al. ............... 463/20 |
| 6,234,896 B1 | 5/2001 | Walker et al. |
| 6,267,671 B1 | 7/2001 | Hogan |
| 6,293,865 B1 * | 9/2001 | Kelly et al. .................. 463/16 |
| 6,306,035 B1 | 10/2001 | Kelly et al. |
| 6,312,333 B1 | 11/2001 | Acres |
| 6,327,573 B1 | 12/2001 | Walker et al. |
| 6,358,149 B1 | 3/2002 | Schneider et al. |
| 2001/0034259 A1 | 10/2001 | Luciano et al. |
| 2001/0034649 A1 | 10/2001 | Acres |
| 2001/0041610 A1 | 11/2001 | Luciano et al. |
| 2001/0046891 A1 | 11/2001 | Acres |
| 2002/0010025 A1 | 1/2002 | Kelly et al. |
| 2002/0065126 A1 | 5/2002 | Miller et al. |
| 2002/0077173 A1 | 6/2002 | Luciano et al. |

FOREIGN PATENT DOCUMENTS

| | | |
|---|---|---|
| AU | 199924973 | 11/1999 |
| AU | 199924974 | 11/1999 |
| AU | 199924975 | 11/1999 |
| AU | 200030185 | 11/2000 |
| EP | 0 525 363 | 3/1999 |
| GB | 2333879 * | 4/1999 |

* cited by examiner

METHOD AND APPARATUS FOR AWARDING AND REDEEMING PROMOTIONAL POINTS AT AN ELECTRONIC GAME

This is a continuation of application Ser. No. 09/489,249, filed Jan. 21, 2000 now abandoned.

BACKGROUND OF THE INVENTION

1. Field of the Invention

The present invention relates generally to awarding, accumulating and redeeming promotional points using an electronic game. More particularly, the present invention relates to an electronic game exhibiting a plurality of display windows or display segments as part of a game display. Each window or display segment of the game display may show a different subject of display such as an interactive game, an Internet connection, a control bar or other element, advertising from sponsors, real time promotional point accumulation totals, promotional or award items for which points may be redeemed, and the like. Game players may accumulate promotional points through a variety of gaming and non-gaming activities and may then exchange the promotional points to purchase promotional or award items, which may be associated with or provided by sponsors. Alternatively, game players may choose to play games where promotional points are tendered instead of money.

2. State of the Art

A number of organizations such as credit card companies, automobile manufacturers, rental car companies, department stores, long distance telephone organizations, financial institutions, casinos and others have offered a number of differently-structured programs for awarding promotional incentives to encourage purchases of goods or services. These incentives have included specific award items or discount offers from catalogs, based on the volume of activity in an account. Other promotional systems have involved discounts on goods or services offered by third parties. For example, discount coupons have been offered for airline tickets based on a minimum level of investment at a bank or savings and loan. Similarly, holders of bank cards have been offered deeply discounted or free air travel based on a certain level of activity using a general purpose charge card or have been credited with frequent flier miles based on activity in a charge card account. Stores or businesses have also issued their own charge cards and awarded store credit based upon amounts charged to the card.

In addition to the promotional awards listed previously, promotional points, which can be exchanged for discounts or promotional items, are sometimes awarded by businesses to encourage customers to spend money on merchandise or services offered by their business. Several decades ago, retail businesses such as department stores, grocery stores and gas stations, began awarding green stamps or trade stamps to customers for purchases made. Promotional points used by many businesses today are similar to green stamps in that they are offered as a reward for spending money. Unlike green stamps, however, many modern promotional points systems electronically store point totals. One example of a promotional point system is found in U.S. Pat. No. 5,537,314 to Kanter (Jul. 16, 1996), the disclosure of which is hereby incorporated herein by reference. Kanter discloses system of networked computers at various local and distant member store locations, all communicating with a central control center. Each of the networked computers records and transmits data relating to sales transactions between program participants and the member stores to the central control center. The central control center then uses the sales data in combination with previous participant performance data, internal award conversion tables, pyramidal association tables, award applicable merchandise UPC codes and other relevant data, to calculate, post and/or issue discounts, raffle entries, store-credit returns, points or cash values in response to the performance of the program participants. Program participants may then collect their award, or redeem their points at pre-selected locations.

Businesses with business sites on the Internet, or "online", have also become involved in awarding promotional points for customers who purchase merchandise online. U.S. Pat. No. 5,937,391 to Ikeda et al. (Aug. 10, 1999), the disclosure of which is hereby incorporated herein by reference, describes an online shopping mall established through a computer network. Ikeda et al. disclose a system wherein promotional points are awarded corresponding to the dollar amount a customer spends on merchandise at the shops in the online shopping mall. A points storage device stores the number of points accumulated by the customer. The points may be redeemed in the form of discounts on purchases at the online shops. By using an online shopping mall system, customers are not required to carry a magnetic card, the time from issuance and redemption of the promotional points can be reduced, and points issuance ratios can be readily altered to encourage purchases at various shops or during various seasons by awarding relatively more points.

U.S. Pat. No. 5,774,870 to Storey (Jun. 30, 1998), the disclosure of which is hereby incorporated herein by reference, also discloses an online shopping system wherein a user may access product catalogs through a program for shopping online. The user may electronically place an order, in response for which the program automatically checks the user's credit and electronically issues a purchase order to the supplying company. The program also calculates award points, updates the award account of enrolled users, and communicates the number of awarded points to the user. Enrolled users may browse through an award catalog and electronically redeem an amount of awarded points towards an item in the catalog. The program then electronically places an award redeeming order with an awards distributor and updates the user's award account. The program may also be configured to display what level of award the user has achieved and how many additional points the user needs to achieve a higher award level.

Like other businesses, casinos have also adopted the concept of awarding promotional points for activities relating to the business of the casino. U.S. Pat. No. 5,761,647 to Boushy (Jun. 2, 1998), the disclosure of which is hereby incorporated herein by reference, relates to a system and method for implementing a customer tracking program to record and store a customer's gaming and non-gaming activity at casino properties. Boushy discloses a computer network system wherein customer information is accumulated at each affiliated casino through one or more local area network ("LAN")-based management systems, updated to a central patron database ("CPDB") that is coupled to each casino LAN through a wide area network ("WAN"). Customer accounts are automatically activated and provided with information from the CPDB each time a customer from one casino property firsts visits an affiliated casino property. Customer accounts are updated with new activity data whenever the casino receives customer data from electronic input devices associated with the customer spending money on casino property. Customers are awarded promotional points based upon their tracked activity at all affiliated casino properties. The point awards are redeemable for gifts, meals, cash and the like, at any of the affiliated casino properties. Like the online shopping mall system of Ikeda et al., Boushy teaches that the point award parameters may be adjusted to encourage activity at different casino properties or different venues within a casino.

When playing electronic games in a casino, promotional points may be awarded based upon amounts wagered, games played, or numerous other money transactions between a player and a casino. However, to determine how many promotional points have been accumulated a player must ask casino personnel at an attended booth. To redeem the promotional points accumulated, a player must visit a self-serve kiosk where promotional prizes are displayed. It would be beneficial to enable a player to more readily determine or even track the player's promotional points and redeem them more easily.

In recent years, it has become known in casinos to add second or so-called "bonus" game structures to existing gaming machines, eligibility to play the second game typically being triggered by an event in play of the first game. In addition, some new gaming machines are configured at the inception with the capability for an additional, bonus game. Bonus games are known to be initiated at some point during play of a first, or primary, game where a predetermined combination of symbols has appeared, or a predetermined number of games has been played by a player.

Methods and apparatus for networking or associating a plurality of electronic devices such as electronic games to a common controller and awarding, tracking and managing promotional points based upon account activity are known in the art. Several examples of promotional points systems have already been previously discussed herein. Some additional examples include U.S. Pat. No. 5,983,196 to Wendkos (Nov. 9, 1999) and U.S. Pat. No. 5,398,932 to Eberhardt et al. (Mar. 21, 1995), the disclosures of each of which patents are incorporated herein by reference.

In addition to their use as a game or for awarding promotional points in casinos, slot machines have also been used to advertise sponsors of a casino. U.S. Pat. No. 5,941,772 to Paige (Aug. 24, 1999) discloses a slot machine used to promote a casino sponsor. The invention of Paige discloses a video display slot machine game wherein the familiar "7-7-7" or bells or cherries on the slot rollers are replaced by product logos of a sponsoring company to link the act of winning with the product advertised. Coded member cards and a computer database are used to collect information on member activity for use in awarding promotional points.

Advertising material has also been incorporated into electronic games. U.S. Pat. No. 5,946,664 to Ebisawa (Aug. 31, 1999) discloses an electronic racing game wherein advertising material is incorporated into the racing game display graphics as if it were part of the original game programming. The advertising material of Ebisawa can be remotely updated by modifying the advertising codes or graphics. U.S. Pat. No. 5,643,088 to Vaughn et al. (Jul. 1, 1997) discloses an interactive game wherein interactive advertising is transmitted to a television or associated display in conjunction with a broadcast of an interactive game event. The game event is rendered interactive by allowing viewers to predict what will happen to the other players in the game, or play along with the game. The advertising is interactive in that a viewer can request additional information about a product or service advertized through an associated keyboard and receive immediate information.

For each of these examples of advertising in electronic games, however, the advertising is not directly before the game player throughout the game being played. The advertising displayed is either intermittent throughout the game (as with Ebisawa and Paige), or alternates with, or is on a separate monitor, from the game (as with Vaughn et al.). Thus, sponsors' advertising material is not before a game player continuously throughout game play.

Electronic games and their methods and apparatus for use are also well known in the art. Electronic games include games of chance, games of skill, and games involving both skill and chance. Examples of several patents describing games of chance include U.S. Pat. No. 5,833,536 to Davids et al. (Nov. 10, 1998), the disclosure of which is hereby incorporated herein by reference, U.S. Pat. No. 5,769,716 to Saffari et al. (Jun. 23, 1998), U.S. Pat. No. 5,820,460 to Fulton (Oct. 13, 1998) and U.S. Pat. No. 5,947,820 to Morro et al. (Sep. 7, 1999).

Figure 1:
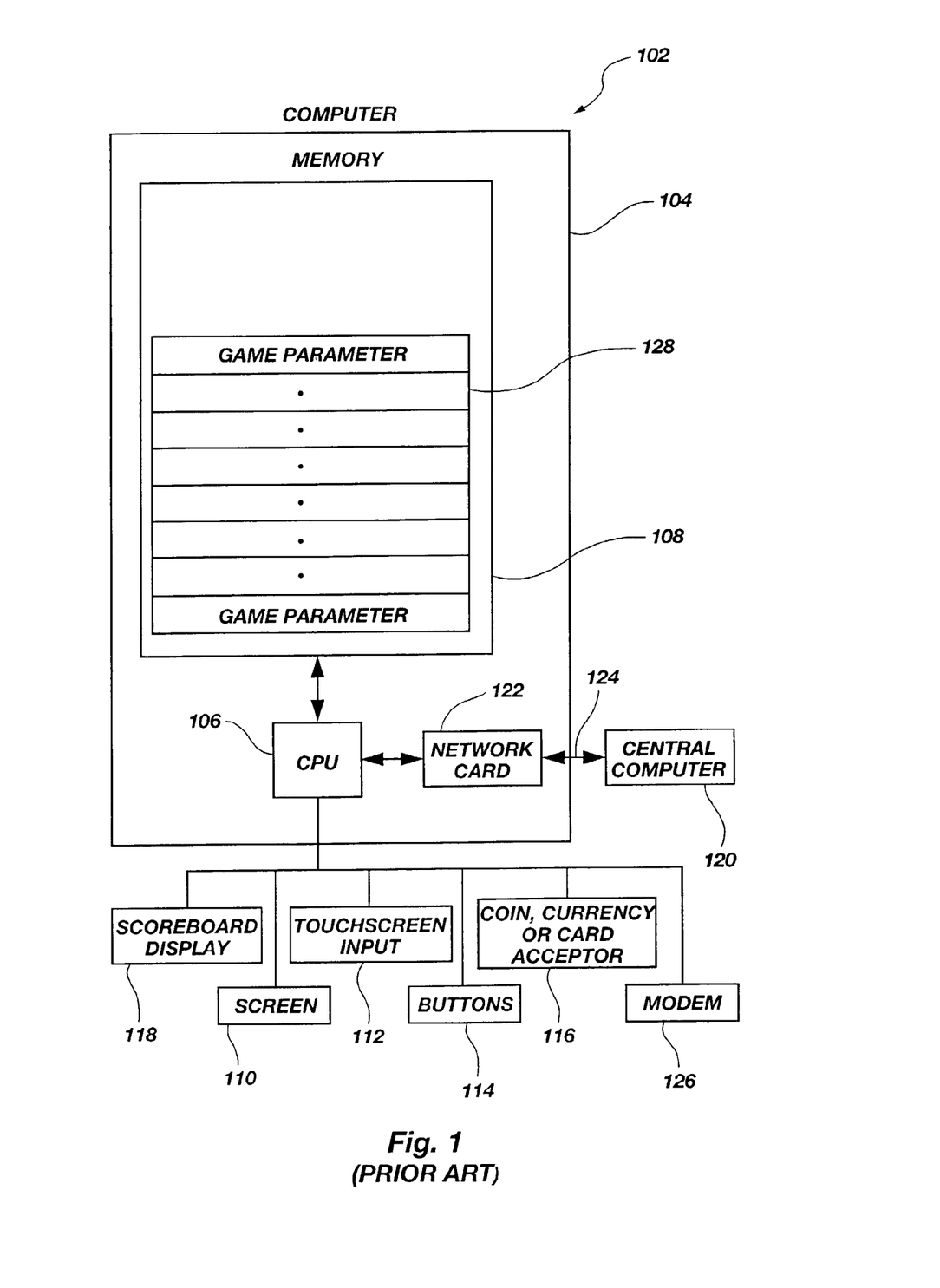
FIG. 1 is block diagram of a prior art electronic game.

FIG. 1 is a block diagram of an electronic game 102 as found in the art. An electronic game 102 typically includes a microprocessor or other computer 104 having a central processing unit ("CPU") 106 and memory 108. The computer may be coupled to a number of peripheral devices such as, by example only, a display screen 110 (e.g., a cathode ray tube ("CRT"), plasma display, liquid crystal display ("LCD"), and/or a display based on light emitting diodes ("LED")), possibly having a touchscreen input 112 (see U.S. Pat. No. 5,951,397 to Dickinson (Sep. 14, 1999)), and/or buttons, keys or other user input devices 114. Preferably a coin, currency or card acceptor device 116 (to accept a credit card, gaming card, smart card and the like) permits a player to activate a game play or place wagers. The electronic game may also include a separate scoreboard display 118.

Electronic games may also be coupled to one or more other computers such as a central computer 120 of a casino, e.g. via a network card 122 and link 124, modem 126 and the like. The game parameters 128, such as how, when and where particular images will appear on the display screen 110, how the game works and how to operate the various elements operably coupled to the computer 104, are stored in the memory 108. The electronic game 102 may be housed in a game housing such as, by example only, those shown in U.S. Pat. Nos. 5,820,460 to Fulton (Oct. 13, 1998) and Des. 404,436 to McGahn et al. (Jan. 19, 1999).

Initiating an electronic game can be done as simply as by inserting a coin or, more comprehensively, for example, by inserting an identification card, such as a "smart card" having a programmed microchip or a magnetic strip coded with a player's identification and credit totals. See U.S. Pat. No. 5,265,874 to Dickinson et al. (Nov. 30, 1993), the disclosure of which is hereby incorporated herein by reference. U.S. Pat. No. 5,806,045 to Biorge et al. (Sep. 8, 1998) uses a writeable identification card, such as a "smart card" to eliminate the need for a network or direct connection between remote systems and a common controller or point database. Promotional point and credit information may be retrieved, recorded and updated using the "smart card." Alternatively, it is known to transfer money to a game through an electronic funds transfer as described in U.S. Pat. No. 5,902,983 to Crevelt et al. (May 11, 1999).

Existing electronic game displays include multiple images representing various aspects of a game such as a game portion, a credit total portion and a wager amount portion. Other electronic game displays include an additional bonus award portion to indicate an amount of a bonus award which may be won, typically through multiple games.

See U.S. Pat. No. 5,851,148 to Burne et al. (Dec. 22, 1998) and U.S. Pat. No. 5,911,418 to Adams (Jun. 15, 1999).

The Internet also includes casino or game host sites offering displays similar to those found in conventional electronic games. Generally, to play an Internet game, a software file is downloaded to a player's computer or terminal, which may then be used to install the necessary software for the game and/or access the casino or game host Internet site. As with a conventional electronic game, Internet electronic games may be accessed using an identification code or name to identify a specific player and retrieve that player's credit total or play history. Unlike standard electronic games, however, many Internet electronic games provide an option to play for free, usually in the context of a "demonstration" game or to teach a potential player about a particular game. Thus, a player may access an electronic game such as a casino game through the Internet, and use "play" money instead of "real" money to enjoy the thrill of playing, without the risk of loss. Any "play" money won, however, has no actual monetary or other value outside of the game context.

BRIEF SUMMARY OF THE INVENTION

The present invention relates to a method and apparatus for awarding and redeeming promotional points using an electronic game, such as a casino game, a video arcade game, or other game of skill or amusement. According to a first aspect of the invention, an electronic game comprises a game display having multiple distinct windows or display segments, each window or display segment displaying a different subject in the form of one or more images. The display may include a touchscreen or alternatively, or additionally, the electronic game may include, by way of example only, an external input with keys, a touch-sensitive surface and/or a moveable control element.

According to a second aspect of the invention, an electronic game display may include a real time promotional point total. The total may include, without limitation, an all-time, or cumulative, point total for all of a player's activities, a total for the present activity, or both.

According to a third aspect of the invention, sponsor advertising material may be constantly displayed on a portion of the game display, such as within a window or other display segment. The advertising material may include, by way of example only, video clips, scrolling letters or icons, or any other advertising material which is capable of being shown on a display.

According to a fourth aspect of the invention, a display segment showing various awards for which promotional points may be exchanged may be included in a portion of the game display, such as within a window. In one embodiment, the award displayed may be associated with sponsor advertisement material shown in a sponsor advertisement window. In another embodiment, the promotional points value of the award shown may intentionally be selected to be greater or less than the promotional points total of the current player to stimulate further play. In a third embodiment, a player may select a particular award for which to redeem the player's promotional points and redeem the points at the electronic game. In all instances, the system may be configured so that the award may be automatically ordered and sent to the player.

According to a fifth aspect of the invention, promotional points accumulated through activities associated with a casino may be exchanged for promotional awards directly with a sponsor.

According to a sixth aspect of the invention, a promotional points system awards promotional points both for activities involving commercial transactions and for those not involving commercial transactions. In other words, players may accumulate promotional points by simply allowing themselves to be exposed to sponsor advertising material or by undertaking other activities where money or equivalent monetary credit is not required to be tendered.

According to a seventh aspect of the invention, an electronic game and method for its use are disclosed wherein promotional points are tendered instead of money, or in addition to money or machine credits. In one embodiment, a game player wagers promotional points for a chance to increase promotional point totals. In another embodiment, a wagering game awards a portion of the player's winnings in money or machine credits exchangeable for money, and a portion of the winnings in promotional points. If the player does not win, the wagering game may change to a second, bonus screen or game where players may randomly select icons or play a different game to determine a promotional points award value. Alternatively, a win may be required to initiate a second bonus screen or game to be played in whole or in part for promotional points. Further, the play of a given number of games or the wager of a given amount of money may be employed to initiate a game using as well as awarding promotional points. In yet another embodiment, a non-wagering electronic game, such as a video arcade game, is initiated using promotional points in exchange for credits to play.

According to an eighth aspect of the invention, an electronic game is disclosed wherein the electronic game may be used to access the Internet. In other words, rather than using a personal computer as an Internet portal, a game machine, either for gaming (wagering) or otherwise and either on a stand-alone basis or through a server, is configured for communication with the Internet. Such communication may comprise a continuous, secure link to a remote server with which the gaming machine is associated, alone or in combination with links to sponsors, to an on-line catalog of awards serving the display of the gaming machine to provide examples of awards redeemable for promotional points, to websites of sponsors or others from whom categories of awards (i.e., books, electronics, gourmet foods, etc.) may be redeemed, and other desirable contacts.

Yet another embodiment of the invention contemplates and includes retrofitting conventional electronic and electro mechanical games with displays and interactive communications capability with remote sites, either through the addition of a secondary or bonus game module or other hardware possessing such features, or a remote communications module or other hardware without an additional gaming feature.

Various combinations of the aforementioned aspects of this invention are described further in detail hereafter. As one of ordinary skill in the art will understand, numerous combinations of these aspects are possible, and those provided are for illustrative and exemplary purposes only and are not in any way limiting the present invention.

BRIEF DESCRIPTION OF THE SEVERAL VIEWS OF THE DRAWINGS

The nature of the present invention as well as other embodiments of the present invention may be more clearly understood by reference to the following detailed description of the invention, to the appended claims, and to the several drawings herein, wherein:

DETAILED DESCRIPTION OF THE INVENTION

Figure 2:
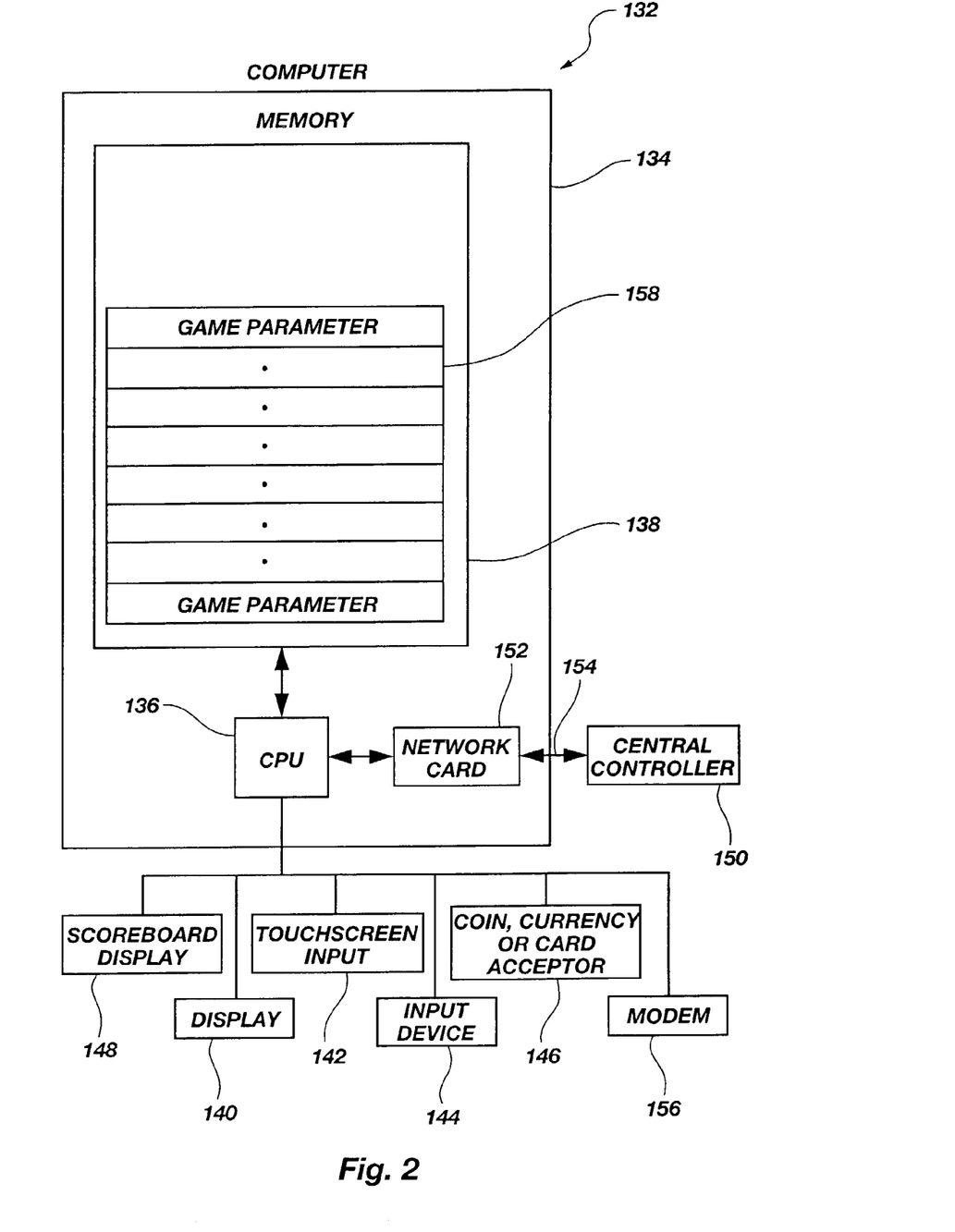
FIG. 2 is a block diagram of an electronic game according to the present invention.

FIG. 2 illustrates a block diagram of an electronic game according to the present invention. Like prior art electronic games, the electronic game 132 of FIG. 2 includes a microprocessor or other computer 134 having a central processing unit ("CPU") 136 and memory 138. Similarly, the computer of the electronic game 132 of FIG. 2 may be coupled to a number of peripheral devices such as, by way of example only, a display 140, possibly having a touchscreen input 142, and/or other user input devices 144, a coin, currency or card acceptor device 146 and a separate scoreboard display 148. Furthermore, like prior art electronic games, the electronic game 132 of FIG. 2 may also be coupled to one or more other computers such as a central controller 150 of a casino through a network card 152 and link 154, modem 156 and the like.

Distinct from the prior art are the game parameters and display. The game parameters 158 of the present invention include programming to define multiple windows or display segments, or programming to direct internally produced or externally received signals to various window image emitters so that different subject matter may be displayed in different windows on one or more game displays 2, as depicted in FIG. 3.

A game display 2, such as that which would be used in the electronic game 132 shown in FIG. 2, may comprise, without limitation, a monitor, such as a computer monitor, a television display, or any other electronic device configured to display a game image. By way of example only, suitable display technologies may include the aforementioned CRT, plasma, LCD and LED displays. The display may be of any desired configuration, such as a square, rectangle, elongated rectangle, etc. The game display 2 may include a touchscreen, or includes some other touch-sensitive display overlay to allow for player interaction with the images on the display. The display 2 may also have associated one or more separate player input devices, such as a mouse, touchpad, joystick, rollerball, keypad, or other mechanical or electrical, electronic, magnetic or optical switching or control elements, to facilitate interaction, such element(s) being previously identified generically in FIG. 2 by reference numeral 144.

Figure 3:
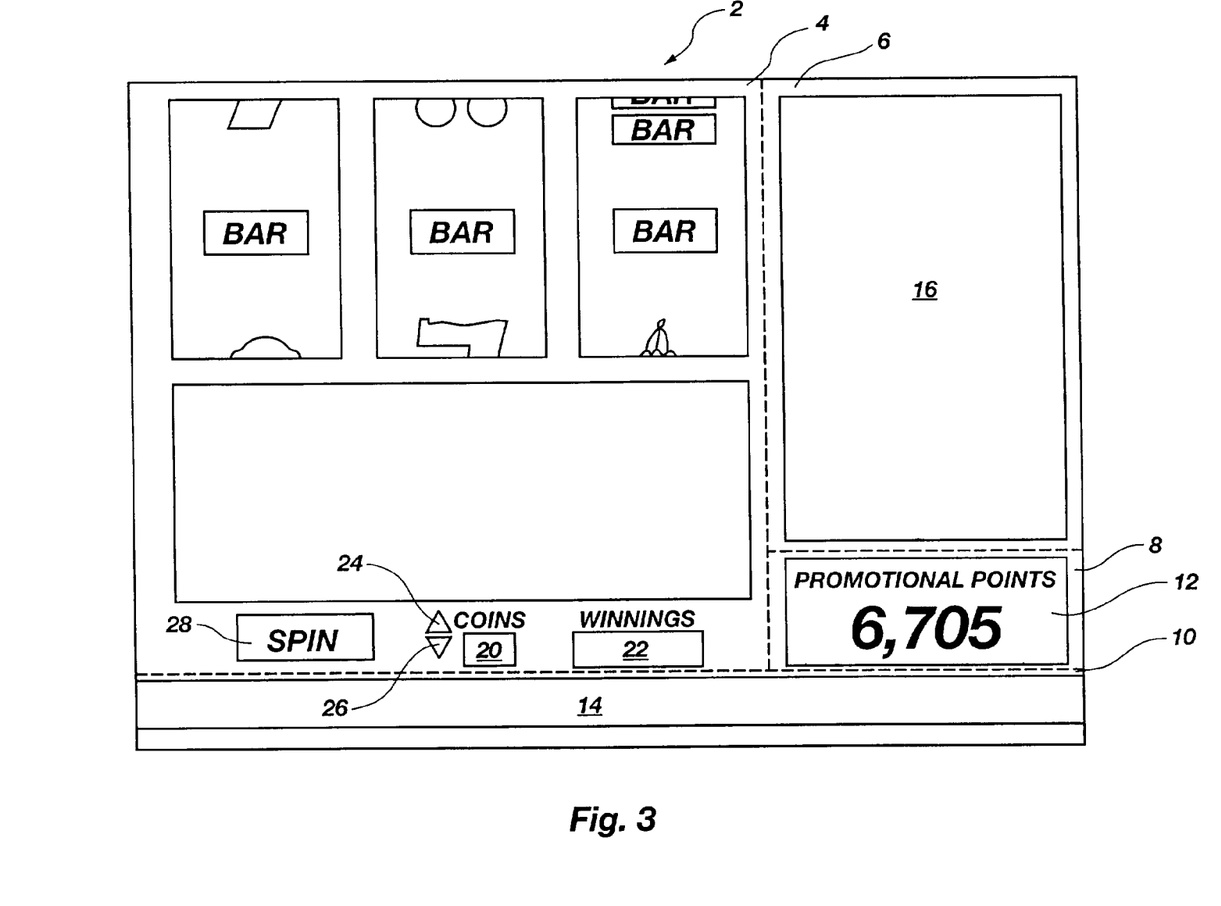
FIG. 3 is an embodiment of an exemplary electronic game display according to the present invention.

As shown in FIG. 3, the game display 2 of a preferred embodiment of the present invention comprises a plurality of windows or display segments 4, 6, 8 and 10, each window or segment displaying a different subject of display comprising one or more images related to the subject of display. For illustrative purposes only, each of the plurality of windows or segments 4, 6, 8 and 10 in FIG. 3 are separated by dashed lines. In practice, any of the plurality of windows may have the same or different background patterns or images, or be defined within contrasting borders to emphasize the distinctions between the windows. Alternatively, the windows or segments may be structured to eliminate distinct inter-window borders so as to induce the player's eyes to scan the entire display.

Employing separate, multiple windows or display segments, or at least a separate window or display segment for a wagering game, is significant because a separate and secure signal may thus be transmitted to and received from the wagering portion of an electronic game. By using a separate and secure signal for interaction with a game at the player's remote location, the odds of winning or any other aspect of the game cannot be manipulated, adjusted or otherwise altered by other signals initiating changes on the display, or by the player interacting with the display other than playing the game. Thus, the integrity of the game is maintained. Another advantage of using separate, multiple windows to display different aspects of a game display is that one or more of the multiple windows can change and be controlled without affecting the performance or appearance of the remaining windows. Using a single window having different sections may be less preferred than multiple windows because each time an image is modified in a single window, the remaining images in that window are affected in either appearance, redraw speed, or other performance-related parameter. As will be clear to one of ordinary skill in the art, separate windows may also be formed on a plurality of separate displays and still be in accordance with the teachings of the present invention.

Multiple, separate windows may be formed on a single or multiple displays by using standard HTML, Java or other programming code as is common and well known in relation to Internet page programming. To promote security, however, the electronic game portion of the display is most preferably received as a separate signal from the remainder of the game display. Further, and for additional security and flexibility in signal transmission, multiple, separate windows may be formed using a display or displays having multiple tuners or receivers, each receiving separate display signals. An example of a display configured for receiving and displaying multiple display signals is that associated with picture-in-picture technology, such as that available from Sony, Inc. Another example of a display capable of receiving and displaying images from multiple signals is a plasma display such as that distributed by Gearhouse Multimedia of the United Kingdom. Displays such as plasma displays and picture-in-picture displays, though more expensive than ordinary displays, allow for greater versatility and security than ordinary displays.

Another possible alternative for creating a game display with multiple windows or display segments would be to use a flat panel LED display with discrete, separately-controlled sub-arrays fabricated on a semiconductor substrate or a plurality of arrayed semiconductor substrates, employing technology developed by Micron Technology, Inc. of Boise, Id. By incorporating multiple windows or display segments in a single display through sub-arrays at predetermined locations, each of the different sub-arrays may be activated simultaneously using different signals. This approach would allow a user to display multiple distinct images responsive to distinct signals on a single display, to easily integrate images from multiple sources, or relating to multiple topics, and manipulate one or more of those images without affecting the others.

The window or display segment 8 of the game display 2 of FIG. 3 includes a promotional points display 12 to indicate the total promotional points accumulated to date by the current player. As used herein, the term "promotional points" contemplates a non-monetary tally having value which may be exchanged for goods or services. Optionally, a monetary value may be assigned to each promotional point. It is most preferable that the promotional points display 12 show not only the promotional points accumulated by the current player from the current activity, but also the promotional points accumulated by the current player from all other activities. However, the promotional points display 12 may alternatively be configured to display only the promotional points accumulated during the current session at the game, or an additional window 12 may be included to display those points. Most preferably, both the cumulative promotional points display and the present game promotional points are displayed. Additionally, or in lieu of video-type promotional points display 12, a physical confirmation and manifestation of one or more promotional points totals may be provided. Such a physical manifestation may include, without limitation, a tape or card output to provide the player with a tangible, portable expression of the player's promotional point totals. Such an item may be automatically generated by the gaming machine, or responsive to a player request, as by touching a portion of the display, or a dedicated key or other element.

By including a "real time" promotional points total 12 on the game display 2, a player may see how different behaviors at the game affect the promotional point total. As used herein, the term "real time" means and includes "substantially real time" or relatively rapid, intermittent (e.g., every 15 seconds, every minute, at the conclusion of each game, etc.) but not necessarily instantaneous updating of points totals. In this way, a player is not required to contact casino staff for a current point total or check the total at a location remote from the game he or she is playing. The player can know the promotional point total at any given time during play by simply checking a game display 2 with which he or she is interacting. Additionally, by having the promotional points total 12 displayed and increasing in real time while the player is playing any given game or at least at the conclusion of each game, the player is constantly encouraged to continue playing the game in a way to maximize promotional points.

Most preferably, the promotional points total 12 will increase whether the player is winning or losing games. Thus, even if the player is losing games (and consequently the money tendered to play those games), the player's actions are rewarded by an immediately increased promotional points score. For example, a player may be awarded 10 promotional points for wagering one coin, or 20 promotional points for wagering two coins. Alternatively, the promotional points awarded per wager may be enhanced for larger wagers (e.g., 10 points per one coin wagered, 22 for two, 35 for three, etc.). Even though the player may lose more coins for wagering more, because the promotional points increase faster by wagering more coins, the player is encouraged to wager more coins.

Additionally, a game may be configured so that a portion of a player's winnings may be awarded in money, or machine credits convertible to money, while a portion of the winnings is awarded in promotional points. For example, if a player won what would ordinarily be paid-out as 20 coins, the system may be configured to pay out 10 coins and 100 points. In this way, the tendency of a player to associate the game with accumulation of promotional points and thus with sponsors' products may be promoted, and players can play to accumulate points faster. If a player wins 0 coins, the game, rather than simply awarding promotional points based on the amount wagered or game played, may be configured to change to a bonus screen comprising an additional game, such as a random icon selection, which reveals a player's promotional point award for that game's play. Further, a monetary win may trigger a second, bonus screen or game to be played in whole or in part with promotional points. With this award system, a player is rewarded whether the player is winning or losing. Thus, a player is encouraged to continue play by the promotional points earned through game play, and further encouraged to continue play by the bonus games in excess of those played for money which may be triggered by continued game play. It is contemplated that paying winnings as part money and part promotional points rather than all money or all promotional points may be established as a player-selected option, or may be associated with only particular games or events triggered during the play of games as desired for a given application. Optionally assigning a monetary value assigned to a promotional point may also assist in determining the number of promotional points required for a particular award. Obviously, any of such payment techniques is equally applicable to the use of debit and credit cards, and other forms of monetary exchange.

FIG. 3 also illustrates an exemplary sponsor advertising display 14 in a window or display segment 10 on the game display 2. The sponsor advertising display 14 shows information relating to sponsors to encourage players to like and buy sponsor merchandise or use sponsor services. The information shown in the sponsor advertising display 14 may comprise either still or moving images, pictures or words, or combinations thereof. The use of scrolling messages and graphics is also contemplated. Preferably, the sponsor advertising display 14 shows advertising material at all times, which may be rotated from sponsor to sponsor for a group of sponsors, either on a regular basis or in correspondence to the sponsor's advertising contributions. In this way, whether a player is playing the game or not, the advertising information is always in the public view. Moreover, due to the ability to identify an individual playing a game, as further detailed below, the promotional material of a particular sponsor or sponsors may be activated for a particular display based upon the individual's redemption patterns for promotional points, or his or her lifestyle patterns as indicated by the tracking of non-gaming activities through the player identification process.

Conventionally, promotional or advertising information is placed on a wall, a separate television monitor, or the housing of a game. However, as players play electronic games, their attention is heavily focused on the game display 2. By placing and maintaining a sponsor advertising display 14 on the game display 2, the players are constantly exposed to sponsor advertising material. Although the sponsor advertising display 14 is shown as a banner in FIG. 3, it is contemplated that the sponsor advertising display 14 may be any size and shape. It may be that for a particular application, the sponsor advertising display 14 is of a size and shape to conveniently show entire commercials of sponsors, such as are conventionally shown on television.

The game display 2 shown in FIG. 3 also includes a window or display segment 6 exhibiting an awards display 16. The awards display 16 shows items or services for which players may exchange their promotional points. The awards display 16 may continue to show a single award option or, more preferably, cycle through numerous award options.

Alternatively, the awards display 16 may have an interactive control among input devices 144 by which a player could access a list of specific awards or award categories (sporting goods, electronic devices, travel, lodging, etc.), or even search a database of awards or an online sponsor catalogue or catalogues to choose an award or category toward which the player desires to accumulate points. Preferably, the awards display 16 includes a portion which indicates the number of promotional points required to exchange for the item or services shown. Optionally, the awards shown in the awards display 16 may be automatically selected by the system (see description below associated with FIG. 4) to correspond to awards which require more points than the player has currently accumulated. In this way, the player is encouraged to continue play so that the promotional points will increase towards the higher value required for the displayed award or awards. As a further option, the awards shown may be of a value less than the total promotional points accumulated by the player, to stimulate an award redemption and the attendant immediate gratification for playing the game. The award or awards shown may also be selected in response to a player's interests, hobbies, age, gender, spending habits, or other characteristic which may be associated with the player through the player's unique identifier.

It is also contemplated that from the window or display segment 6 exhibiting the awards display 16, promotional points may be redeemed by a player at that particular game for a desired displayed item once a point total has been reached. In this way, once a player has accumulated a sufficient number of promotional points, the player may immediately redeem those points at the electronic game and again begin accumulating points for another award. By coupling the game controller to an awards database and providing interactive award selection control elements and instructions on the display 2 or adjacent housing of the game, a player can redeem points through the electronic game, and even while playing the game. In other words, the player may proactively select a redemption activity in the midst of the game, or a particular game event occurrence may be programmed to trigger a point redemption wherein an award may be redeemed at a promotional point "discount" during the pendency of that particular game or for a given period (for example, 5 minutes) thereafter. For example, if a given award usually requires the redemption of 10,000 points, a "wild card" redemption event could reduce the award to 8,000 points if completed immediately. Further, such wild card redemption events may be programmed to be triggered randomly, or for a given number of games played, or money wagered, over a selected period of time (for example, twenty-four hours, 30 days, one year).

Once a player indicates a particular award for which the player would like to exchange promotional points and confirms an award redemption, the promotional point total 12 displayed may be replaced with an updated promotional point total in real time. The central controller 30 (FIG. 4) or other sub-system subtracts or deducts the promotional point value or "price" of the award selected from the player's cumulative promotional point total 12 in response to the player selecting the award, and replaces the displayed promotional points total 12 with an updated promotional points total.

Figure 4:
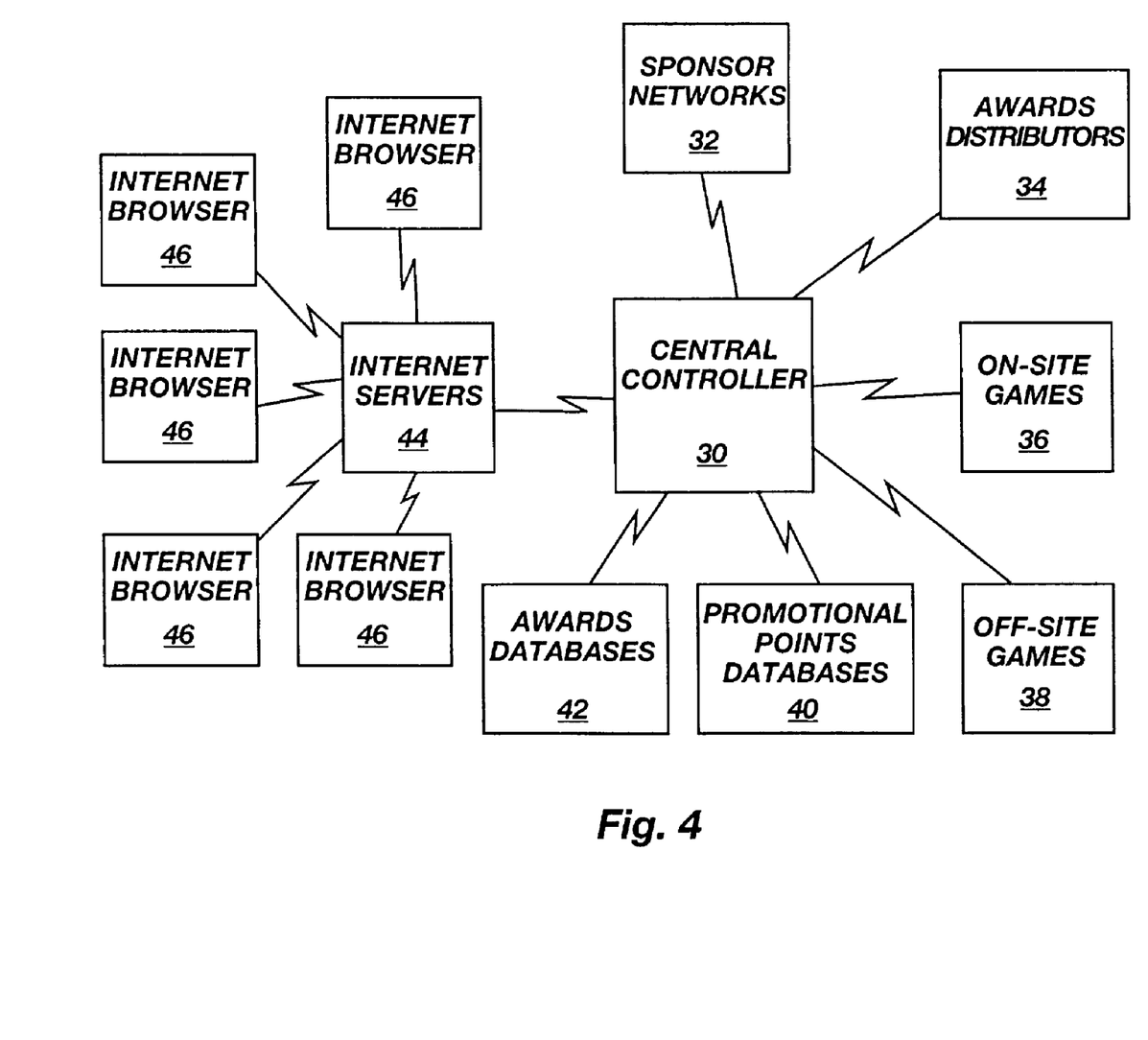
FIG. 4 is a block diagram of an electronic game system according to the present invention.

In further reference to FIG. 4, once a player has selected and confirmed an award for which the player would like to redeem promotional points, the central controller 30 may then contact a sponsor 32 or an awards distributor 34 to automatically order the award selected by the player. From the player's unique identifier, which is associated with the player's promotional point total and also associated with other information related to the player or provided by the player at the game, such as a password, PIN or other identifier for security purposes, a sponsor 32 or award distributor 34 may send the selected award to the player's hotel room, home address, or other location indicated by the player if such an option is afforded. Alternatively, a player may redeem the promotional points for an award directly from the sponsor at the sponsor's place of business or Internet site, or by phone. By providing each sponsor with access to a common promotional point database, promotional point totals may be immediately updated as points are redeemed or accumulated at any location. It is contemplated that a promotional points database 40, or another database 40 associated with the central controller 30, may store not only a player's promotional points total in association with the player's unique identifier, but also other personal information without limitation, such as a player's address, birth date, gender, marital status, interests, hobbies, sports, spending habits, credit information, occupation, and other information which may assist a sponsor to relate and transact with the player more readily. Such sponsors may include, without limitation, retail stores, restaurants, airlines, rental agencies, product manufacturers, theaters, travel agencies, cities or other sponsor with a good or service the sponsor wishes to promote or exchange for promotional points. If the award selected requires more promotional points than the player has accumulated, the central controller 30, or the CPU of the electronic game may optionally offer the player a discounted price in cash or credit for the award, or deny the exchange.

Returning to FIG. 3, the game portion of the game display 2 is shown in a main window or display segment 4. The main window or display segment 4, as illustrated, shows an embodiment of a slot machine game which includes a portion 18 through which a title, image of the game, or some video or other graphic display to catch the attention of potential players, may be shown. The main window or display segment 4 also includes a winnings box 22 to display the amount the player has left on account with which to wager or winnings for a particular spin, a coins box 20 to display the number of coins which are wagered with a particular spin, up and down arrows 24 and 26 to increase or decrease the number of coins wagered with a particular spin, and a spin button 28 to initiate each play of the game. Although FIG. 1 illustrates an embodiment of an exemplary slot machine game in the main window or display segment 4, any number of games may be substituted for the game displayed, each having its own display and interactive controls, in accordance with the invention. As known in the art, the gaming machine may be configured, by employment of suitable hardware and software as known in the art, for play of one of a variety of games at the same machine in response to player selection from a choice of games. Examples of suitable games for use in accordance with the invention include, without limitation, those conventionally found in casinos such as Black Jack, Craps, Roulette, Keno, Bingo, Reel, various other Slot Machine games comprising or simulating a plurality of rotating wheels, various Poker games, and Baccarat. Of course, any other casino-type, or other wagering game which may be electronically simulated as well as other electronic games, such as video arcade games or other games of skill or amusement, may be employed and displayed. As used herein, the term "casino-type", "gaming" or "wagering" game, machine, or activity, means and respectively includes games, machines or activities wherein monetary or other value is placed at risk (i.e., wagered) in return for a possible return of some value pending the outcome of the activity, a portion of the activity, or a participant's performance during the activity. Activities other than gaming activities may be referred to herein as "non-gaming" activities.

FIG. 4 illustrates a promotional points system having a central controller 30 to coordinate and control activities and data transfer among the various links to sponsors 32, awards distributors 34, on-site games 36, off-site games 38, promotional points databases 40, awards databases 42 and Internet servers 44.

As should be clear to one of ordinary skill in the art, the foregoing description of a game display may be implemented through a single display, or group of displays housed in a decorative casing or casings and coupled, directly or indirectly, to a common central controller 30 such as through a local area network ("LAN") and/or through a wide area network ("WAN"). Alternatively, multiple central controllers 30 may have access to a common promotional points database 40. Single or group displays and housings would particularly be useful in a casino, a shopping mall, a grocery store or other retail store, or the like, where a variety of customers are passing or spending money and may desire to play a game. With the electronic game system as illustrated in FIG. 4, multiple communication lines from the central controller 30 may be coupled to the display controller of a game to relay and modify display data in the multiple game display windows. The communication lines may include, without limitation, electronic or other data transferring cable (including optical as well as electrical), radio frequency wave transmissions including cellular frequency transmissions as well as microwave, satellite dish frequencies, etc., phone lines (again both optical and electrical) and the like, such as is common with remote communication systems. More preferably, however, the function and displays on the computer may be fixed by hardware and software included within the game circuitry to minimize communication with the central controller 30. In either embodiment, a player's promotional points total may be retrieved at the game location through the central controller 30 from a promotional points database 40 associated with the central controller 30 when the game is accessed by a player. Alternatively, promotional point totals, identification information and other information, such as credit amounts, may be retrieved from and updated to a "smart card" or other recording device kept in a player's possession. As used herein, the term "remote" means and includes sites using communication lines to communicate one or more signals with a single site.

The game display and interaction may also be implemented through an Internet or Intranet server 44 as an Internet or Intranet display to be viewed by at least one Internet browser 46. In this way, connection to a game and accumulation of promotional points, may be accomplished with only a connection to the server 44 through a conventional phone or other data transmission line, digital signal line ("DSL"), T-1 line, coaxial cable, fiber optic cable, or other connection known in the art. It is will also be understood by those of ordinary skill in the art that enhanced bandwidth of digital wireless communications may render such technology suitable for some or all communications according to the present invention, particularly if such communications are encrypted. It will be further understood and appreciated by those of ordinary skill in the art that higher data transmission speeds may be useful for enhancing the sophistication and response of the display and interaction with the player. Even in an Internet embodiment, the game display may be housed in a decorative housing. One advantage to this embodiment, however, is that players may access an Internet game page from any location where an Internet connection and computer, or other Internet facilitator such as the so-called "WebTV" boxes, are available. The expansion in the number of computers and number and speed of Internet connections in recent years increases opportunities for players to play and increase their promotional points from home or work, as well as in the casino.

In another aspect of the present invention, it is contemplated that players may accumulate promotional points through a variety of gaming and non-gaming activities. A significant concern and desire of sponsors, is for players to become familiar with the sponsors' names and products. Awarding promotional points to players for playing games having images of the sponsors' names, logos, products and marketing information on the game display directly before the players helps to familiarize players with the sponsors displayed.

Moreover, sponsors may award promotional points for non-gaming activities, both where money is spent, and where it is not. For example, to encourage customers to shop more at their stores or websites, sponsors may award promotional points for spending money in the sponsors' stores or websites, or using the sponsors' services or products. Additionally, sponsors may award promotional points for customers merely visiting locations where the sponsors' products are sold or used, or where the sponsors' advertisements are shown. For example, sponsors may award promotional points to customers who merely visit a sponsors' store, shopping mall, casino, theater, sales promotion, demonstration, Internet site, ATM machine, bank, city, theme park, car dealership, or any other venue or site where a sponsor would benefit simply from a customer's attention, regardless of whether the customer has the specific intent to spend money at that time. This approach may also encourage customers to spend money in a particular location even though the promotional points are awarded simply based upon the customer's presence and not the money the customer spends. For example, by awarding promotional points for time spent in a sponsor's retail store, shopping mall, car dealership, city, etc., customers who are there for any duration of time are more likely to spend money than if they never visited. By a further example, a sponsor who awards promotional points to all attendees at a grand opening of a retail business is likely to encourage more customers to attend. In this way, just by allowing themselves to be exposed to sponsors' names and products, or by familiarizing themselves with a sponsor's business, facilities, location, methods of transaction or other goods or services, customers can accumulate promotional points.

As used herein, "commercial transactions" are those interactions between a customer and a business or other where money or credit is required to be exchanged between the customer and the business. Activities other than commercial transactions are those where money or credit is not required to be exchanged between the customer and the business.

Electronic game systems may be configured to award promotional points, money or any combination of points and money based on any combination of factors which a sponsor may deem point-worthy. Additionally, established money or promotional point award combinations may be modified in response to those same factors. Such factors may include, by way of example only: the duration or frequency of game play at a particular game, casino or casino chain; the amount of money or promotional points exchanged or wagered at a particular game, casino or casino chain; a pattern of player behavior such as patronizing certain businesses, Internet sites, or other locations, or spending certain amounts of money at those locations.

By awarding additional promotional point award combinations to those players who act in ways sponsors desire, players are encouraged to patronize particular stores or buy particular products they may not have chosen without such incentive. Promotional point groups or levels may also be formed based upon the factors previously mentioned, or similar factors, to additionally reward a desired behavior or lifestyle. For example, a player may upgrade to a more beneficial promotional point group, and thus enjoy the benefits of that group, by reaching a certain level of total accumulated promotional points, or a total amount of money spent at a sponsoring business. Group benefits may include, by way of example only, such benefits as: reduced rates on rooms, food, entertainment, airfare, rental cars or the like; advanced promotional point or money accumulation rates; access to particular electronic games, desirable locations, Internet sites and reserved seating; entry into prize drawings; higher promotional point exchange rates; and the ability to exchange promotional points for particular prizes. By adding benefits for levels of promotional points earned (or earned and spent) by a player within a year (or over some other period of time), players and customers are further encouraged to act in ways to obtain more promotional points.

In yet another aspect of the invention, promotional points may be awarded in greater quantities to those patronizing sponsors within a selected group of sponsors. For example, a group of ten sponsors may be identified, and those individuals patronizing at least five (or some other threshold number) of the ten sponsors within a given time period (for example, a month) will receive a points "multiplier", such as 1.2, for all promotional points earned during that period. Alternatively, loyal participation by an individual in the program at a selected number of sponsors within the group during a selected period of time may entitle the individual to an "upgraded" award program in which the points accumulated are assigned greater value for award redemption purposes (e.g., the points become "platinum" points as opposed to "gold" points) as long as the individual continues his or her participation. Such a program may be extended to groups of individuals with linked identifiers, for example to a husband and wife, to encourage modification of behavior of the group and not just the individual.

Figure 6:
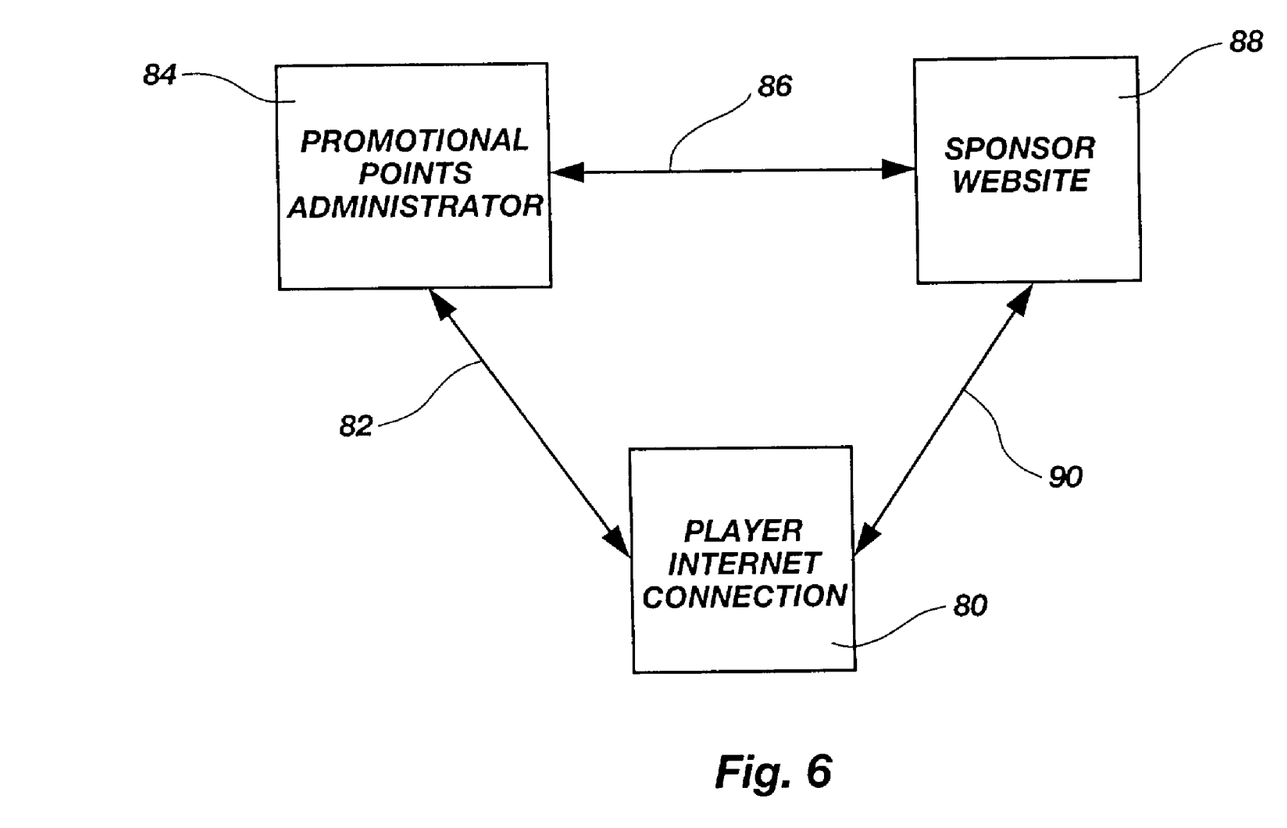
FIG. 6 is a block diagram illustrating a method of redeeming promotional points from a sponsor according to the present invention.

Yet another alternative embodiment of the invention involves linking specific merchant sponsors through the Internet to the player of the game for award redemption. As illustrated by FIG. 6, through a suitably configured electronic game or other site having an Internet connection 80, a player may form a connection 82 with, and select from a catalogue of specific award items to redeem promotional points in a system coordinated by a promotional points administrator 84. A display window including an Internet connection 80 may also be configured to provide broad categories of awards instead of, or in addition to specific items (e.g., electronics, clothing, music, etc.). Upon selecting a specific award or an award category, a player may then be forwarded 86 to the website of a sponsor who has agreed to provide awards responsive to redemption of promotional points, either solely or in combination with money tendered through a credit or debit card. By linking a player wishing to redeem promotional points directly with a sponsor through its website 88, a promotional points administrator 84 may rely on the inventory, ordering and shipping infrastructure already established by the sponsor. In this way, the initial capital investment required by a promotional points administrator 84 wishing to initiate such a system is comparatively minimal. In other words, by relying on sponsors to provide methods of redeeming promotional points online, a promotional points administrator 84 would only need a conventional accounting database and Internet server rather than a complex electronic-commerce ("e-commerce") system or extensive awards inventory, which is already in the possession of the merchant sponsors. To participate in such a system, sponsors may choose to add a payment option to existing payment options on their order displays to enable payment by promotional points or credit and promotional points. A sponsor, following exchange methods which may already be established for the sponsor, may then send the award directly 90 to the player through the sponsor's established shipping channels (e.g., United Parcel Service) according to information input by the player, or associated with the player's unique identifier. Thus, a player may "visit" a sponsor either physically by traveling to redeem promotional points at a sponsor's location, or electronically through the Internet to redeem promotional points online.

Another advantage of linking the player 80 directly to the sponsor website 88 through the Internet is that by redeeming promotional points directly from the sponsor, the player becomes familiarized with the sponsor's website and learns how to "buy" merchandise using the sponsor's normal product or service purchase procedure in the context of promotional points. Thus, the player is educated about the sponsor 88 and its product offering, is more likely to return directly 90 to a sponsor's website 88 for other purchases, and less likely to go to a competing merchant whose website may be unfamiliar and thus more intimidating when purchasing online in the future. In addition, this technique may be employed to educate and familiarize non-Internet "literate" individuals with the ease of purchasing through the Internet, thus eliminating fears about making such "purchases" and making such individuals more likely to patronize the Internet merchant in the future in lieu of physically visiting a retail establishment.

As will be clear to one of ordinary skill in the art, so long as a customer has a unique identifier, sponsors are able to award promotional points, and thus encourage customer behavior in real time, anywhere the sponsor can access the promotional points database, or alternatively, record the customer's number and activity. With respect to sponsors encouraging behavior, it is also contemplated that sponsors may also award promotional points to customers for reading sponsor selected material related to a sponsor's interests or to achieve a sponsor goal such as promoting education or other cause or organization.

As a player approaches a game display and desires to play the game and accumulate promotional points, it is necessary for the player to somehow indicate to the game the unique identity of the player, such as through a unique identifier, so the game can access the player's promotional point total. There are many methods of indicating a player's unique identifier including, but not limited to, bar codes, magnetic encoded data strips, "smart" cards with embedded microchips, personal identification numbers ("PIN"), "Bluetooth" technology electronic communicator, and any other form of identity verification including, magnetic, physical (i.e., thumb print, retinal scan, etc), digital, electronic or optical.

The "Bluetooth" technology, such as that manufactured by Motorola of Phoenix, Ariz., may be used to indicate the player's identification through as a small, short range, low-power, unlicensed, wireless transmitter or transceiver to a corresponding receiver or transceiver within a game. Through this, a player need only approach a game and the game will automatically register the player's identity and promotional points total. Bar codes, magnetic encoded data strips and "smart" cards would require additional game attachments to read the player's identification from identification cards presented by the player. PIN entry may be accomplished within a portion of a window for a touchscreen, or through an external PIN entry device such as a keyboard, keypad or cursor manipulating device such as a touchpad, rollerball or mouse. The use and function of readers and external PIN entry devices are well known in the art.

Another aspect of the present invention is a method of awarding and redeeming promotional points using the promotional points system shown and described in reference to FIGS. 1 and 2. According to an embodiment of the method, a game organization such as a casino or video arcade, having sponsors with products or services to advertise, displays sponsors' advertising material on an electronic game display simultaneous with an electronic game. In this way, players of the game are exposed to the sponsors' advertising material throughout game play. For playing the electronic game, players are awarded promotional points which the players may redeem for discounts or awards from the game organization or the game organization sponsors.

According to another aspect of the present invention, promotional points acquired through gaming and non-gaming activities are used instead of money during game play. In one embodiment, after a player has accumulated any number of promotional points, a player of a casino or other game may choose to wager promotional points rather than money. In this way, the player may significantly increase a promotional point total or, consequently, lose promotional points rather than money. For regions where gambling for money is contrary to the laws of the region, wagering using promotional points offers an attractive alternative. Similarly, casino operators can familiarize players with a casino or casino games by awarding promotional points and offering players a chance to increase their promotional points toward redeeming them for an award. In accordance with other aspects of this invention, because an electronic game display may be displayed through an Internet server, players may play casino games using their promotional points from home, work, or even other locations, as facilitated by the increased availability and bandwidth of digital and cellular phones and other wireless technology.

As will be clear to one of ordinary skill in the art, either a primary, a secondary, or both a primary and a secondary electronic game may be played for promotional points. Furthermore, a secondary or bonus game may be activated responsive to either a win, a loss, or some other event in a first game.

In another embodiment of this aspect of the invention, a player of a non-gaming electronic game may use promotional points as credits for the game rather than money. In this way, as discussed in relation to other aspects of this invention, sponsors of a game organization may choose to award promotional points for a variety of activities, such as visiting sponsors' Internet sites or stores. The promotional points accumulated by a player may then be used for entertainment rather than for redeeming toward specific award items.

Figure 5:
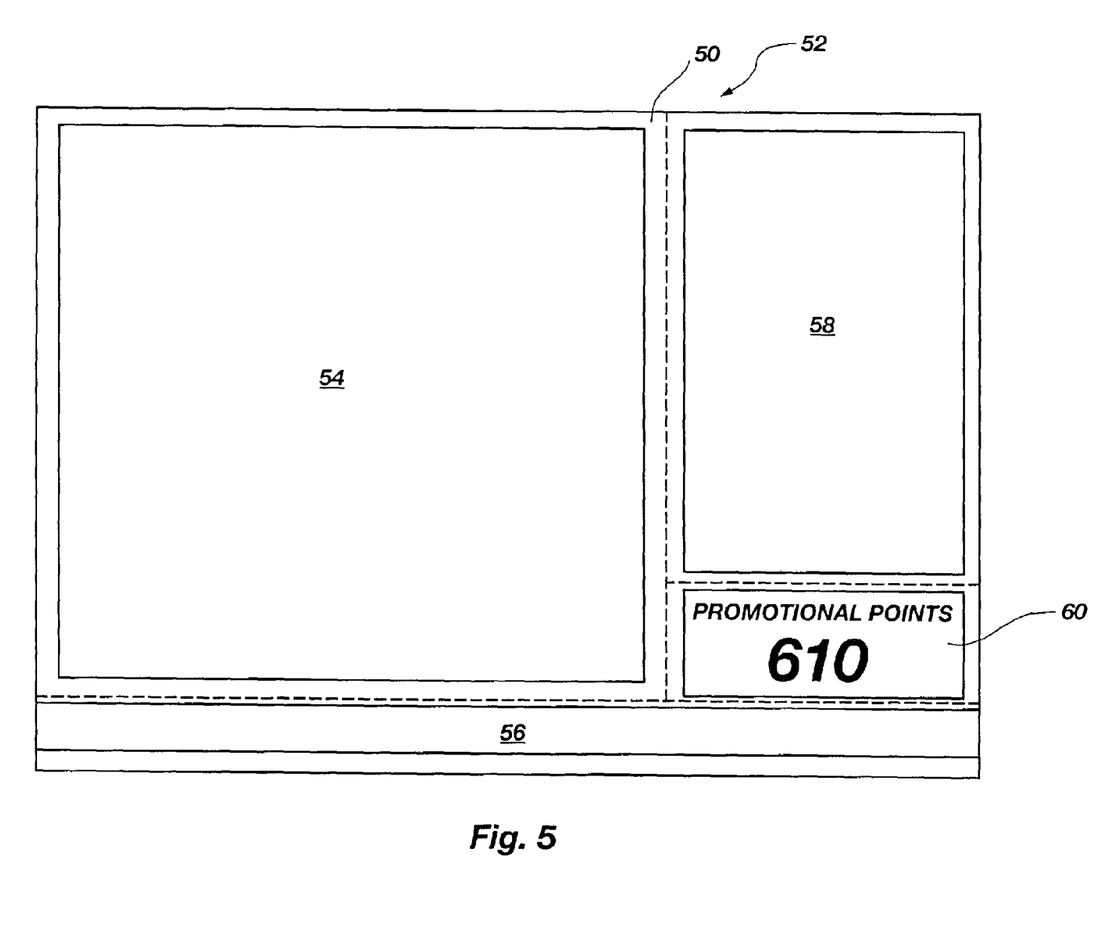
FIG. 5 is an embodiment of a promotional points system display suitable for use according to the present invention.

As will be clear to one of ordinary skill in the art, in accordance with other aspects of the present invention, because the invention contemplates awarding promotional points for activities other than playing games, the main window 50 of the display 52, as shown in FIG. 5, may be configured to display any activity 54 through which an operator may, or may not, accumulate promotional points, such as accessing an ATM. In addition to displaying sponsor advertising material 56, awards 58, and a real time promotional points total 60, as with previous embodiments, the display 52 of FIG. 5 may include, without limitation, such interactive displays as an Internet display for visiting sponsor Internet sites, a television signal display, or other sponsor advertising material.

Figure 7:
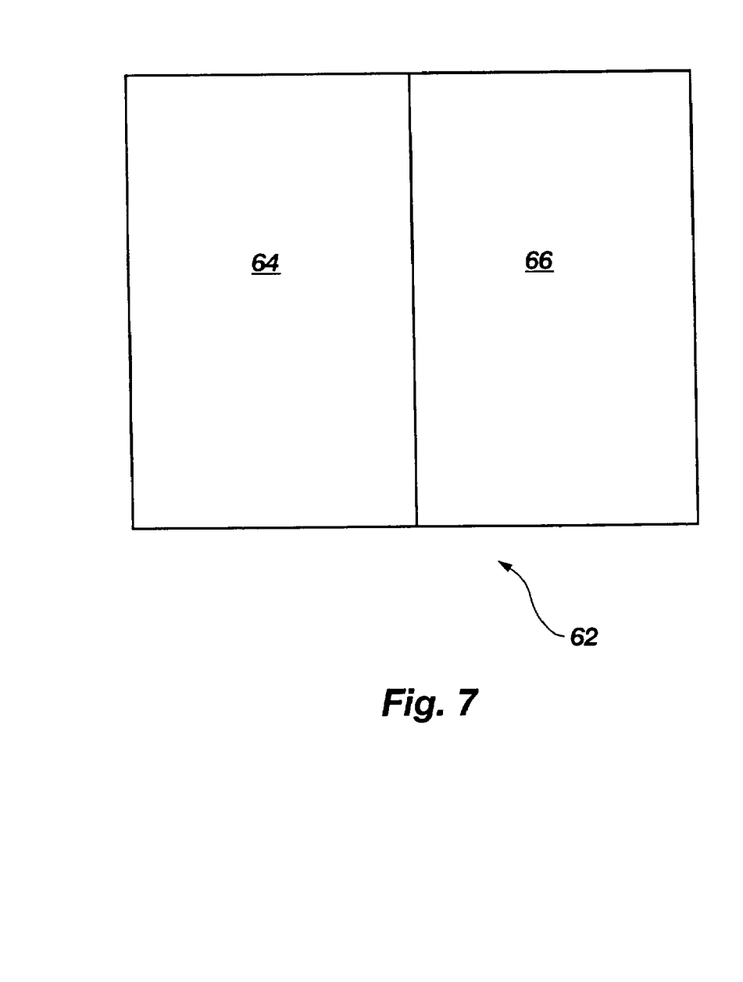
FIG. 7 is an embodiment of an electronic game display according to the present invention.

FIG. 7 depicts an interactive display screen 62 of an electronic game displaying two separate windows or display segments 64 and 66. One of the windows or segments 64 may display an electronic game such as those previously discussed herein, while the other of the windows or segments 66 may display an Internet connection. As used herein, the term "Internet" is distinguished from a dedicated or proprietary LAN or WAN, and means and includes plurality of mutually remote sites having the capability of communicating digital information, at least in part, through communication channels owned or controlled by third parties and being directed and, where necessary, relayed by servers or other suitable apparatus. Such communication channels may include, without limitation, electronic or other data transferring cable (including optical as well as electrical), radio frequency wave transmissions including cellular frequency transmissions as well as microwave, satellite dish frequencies, etc., phone lines (again both optical and electrical) and the like, such as is common with remote communication systems. The interactive display screen 62 may be configured so that one or the other of the windows or segments 64 and 66 are displayed on the entire screen 62, or so that both of the windows or segments 64 and 66 are each displayed simultaneously. Alternatively, the display screen 62 may be configured to adjust the number of displayed windows, or change its displayed image at a player's option, or in response to an event such as the end of a game. The Internet window 66 may be configured to display and select sponsor advertising, promotional points totals, promotional awards, event schedules, sponsor product catalogs, ordering information and any other information which may be placed upon or found through the Internet. The Internet window 66 may be configured to allow game players to choose a particular Internet site, promotional point award or advertisement during play, or, according previously described aspects of the present invention, be configured to display specific awards or groups of awards related to any number of factors associated with a player's unique identifier such as, by example only, a player's interests, background and promotional points total. The Internet window 66 may be used, without limitation, to reward for player performance, to redeem points, to visit sponsor Internet sites, visit chat rooms, order goods or services, view entertainment, or simply to browse the Internet.

Figure 8:
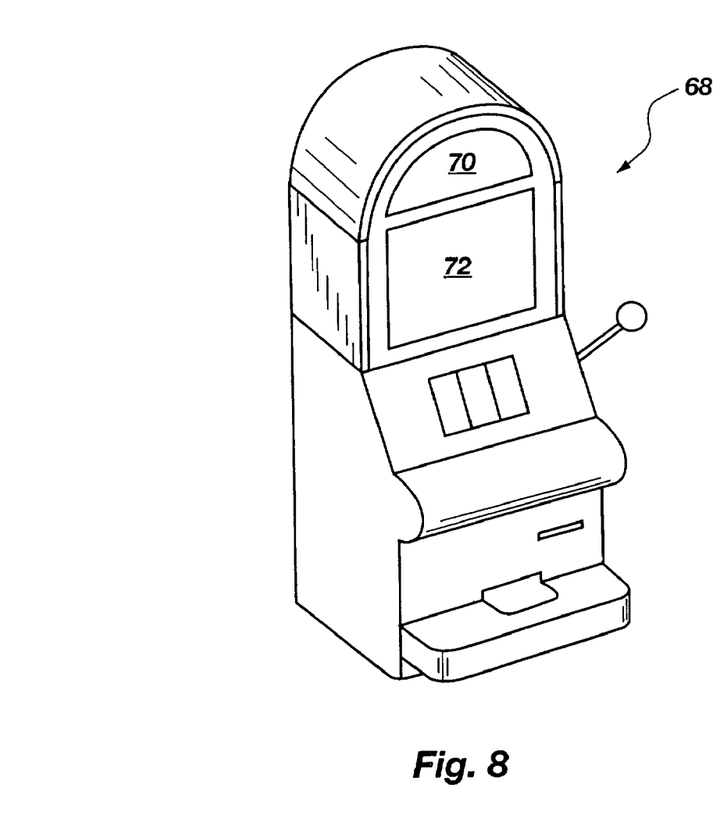
FIG. 8 is an embodiment of a retrofitted electronic game according to the present invention.

As used herein, the term "electronic game" means and includes not only completely electronic games including a display driven responsive to a signal. The term "electronic game" also means and includes portable games which may be physically connected to a host system by a permanent or removable connection, or which may be connected or in communication therewith using wireless technology. Further, the term specifically includes, without limitation, conventional, existing electronic or electromechanical machines to which may be added an electronic display. For example, and without limitation, a bonus or secondary game retrofit may be made to a conventional electromechanical game to detect game activity and payouts from the conventional game for purposes of accumulation and display of promotional points, redemption of awards through tendering of promotional points, and display of non-game related images such as sponsor advertising and awards display. Optionally, a retrofit of what may be termed a remote communications module in accordance with the invention may be made to a conventional, stand-alone electronic or electromechanical gaming or other game machine for accumulation and display of promotional points, redemption of awards, and display of sponsor advertising and awards. FIG. 8 illustrates an electronic game 68 configured as a slot machine having a remote communications module 70 and display 72. The display 72, as described in regard to other aspects of the present invention, may display, without limitation, bonus games, Internet access, promotional points, sponsor advertisements or awards, and other helpful or exciting images. It is believed that one of ordinary skill in the art will understand how to retrofit an electronic game with a remote communications module 70 using conventionally available parts. In a basic embodiment, a suitable display, circuit board and modem coupled together with the existing game would be sufficient to retrofit a conventional electronic game to respond as an electronic game in accordance with aspects of the present invention. Other embodiments involving different forms of displays, communications methods and multiple circuit boards may also be used as will be clear to one of ordinary skill in the art.

The term "electronic game" also means and includes an apparatus according to the present invention which includes features other than electronic ones. For example, an electromechanical slot machine apparatus comprising a plurality of adjacent, rotatable wheels may be combined and operably coupled with an electronic display of any suitable type, and an associated signal linkage to one or more remote sites. In this instance, the electromechanical device would constitute one of the "windows" of the overall display exhibited by the apparatus.

In a further aspect of the present invention, the tracking of an individual's gaming habits in accordance with the method and apparatus of the present invention may be extended to table or other non-electronic games played in a casino setting or the like, such as through the player tendering his or her identifying indicia in conjunction with legal tender to be wagered at a game site or other site within a casino. Optionally, the same methodology may be employed in conjunction with redemption for money or credit of chips, tokens or other value elements employed in games such as, without limitation, Blackjack, Poker, Roulette and Craps.

Although the present invention has been shown and described with respect to preferred embodiments, various additions, deletions and modifications that are obvious to a person skilled in the art to which the invention pertains, even if not shown or specifically described herein, are deemed to lie within the scope of the invention as encompassed by the following claims.

What is claimed is:

1. A gaming apparatus comprising:
   a display unit that is capable of generating video images;
   a value input device; and
   a controller operatively coupled to the display unit and the value input device, the controller comprising a processor and a memory operatively coupled to the processor,
   the controller being programmed to allow a person to make a wager;
   the controller being programmed to cause a video image to be generated on the display unit, the video image representing a game,
   the controller being programmed to determine a value payout associated with an outcome of the game represented by the video image,
   the controller being programmed to provide a first portion of the value payout in at least one of money or money credits; and
   the controller being programmed to provide a second portion of the value payout in promotional points, the promotional points being a non-monetary tally having a value which is exchanged for goods or services.

2. The gaming apparatus as defined in claim 1 wherein the controller is programmed to cause a video image representing a game to be generated on the display unit, the video image representing one of the following games: poker, blackjack, slots, keno, bingo, craps, roulette and baccarat.

3. The gaming apparatus as defined in claim 1 wherein:
   the controller is programmed to cause a video image to be generated on the display unit, the video image comprising a plurality of simulated slot machine reels of a slots game, each of the slot machine reels having a plurality of slot machine symbols; and
   the controller is programmed to determine a value payout associated with an outcome of the slots game, the controller being programmed to determine the outcome of the slots game based on a configuration of the slot machine symbols.

4. The gaming apparatus as defined in claim 1, additionally comprising:
   the controller is programmed to provide a second portion of the value payout in promotional points according to a player selection.

5. The gaming apparatus as defined in claim 1, additionally comprising:
   the controller is programmed to provide a second portion of the value payout in promotional points according to a game event associated with play of the game.

6. The gaming apparatus as defined in claim 1, additionally comprising:
   the controller is programmed to cause another video image to be generated on the display unit according to the outcome of the game, the another video image representing a bonus game;
   the controller is programmed to determine a value payout associated with an outcome of the bonus game; and
   the controller is programmed to provide the value payout associated with the outcome of the bonus game in promotional points.

7. A gaming system comprising:
   a plurality of gaming apparatuses, each of the gaming apparatuses comprising:
   a display unit that is capable of generating video images;
   a value input device; and
   a controller operatively coupled to the display unit and the value input device, the controller comprising a processor and a memory operatively coupled to the processor,
   the controller being programmed to allow a person to make a wager;
   the controller being programmed to cause a video image to be generated on the display unit, the video image representing a game,
   the controller being programmed to determine a value payout associated with an outcome of the game represented by the video image,
   the controller being programmed to provide a first portion of the value payout in at least one of money or money credits; and
   the controller being programmed to provide a second portion of the value payout in promotional points, the promotional points being a non-monetary tally having a value which is exchanged for goods or services,
   the gaming apparatuses being interconnected to form a network of gaming apparatuses.

8. The gaming system as defined in claim 7, wherein the gaming apparatuses are interconnected via the Internet.

* * * * *